Jan. 15, 1963  R. W. KRITZER  3,073,461
FIN STOCK FEEDING APPARATUS
Filed April 20, 1961  5 Sheets-Sheet 1

INVENTOR:
RICHARD W. KRITZER
BY
ATT'Y

Jan. 15, 1963 R. W. KRITZER 3,073,461
FIN STOCK FEEDING APPARATUS
Filed April 20, 1961 5 Sheets-Sheet 2

INVENTOR:
RICHARD W. KRITZER
BY
Norman Gerlach
ATT'Y

Jan. 15, 1963  R. W. KRITZER  3,073,461
FIN STOCK FEEDING APPARATUS
Filed April 20, 1961  5 Sheets-Sheet 4

INVENTOR:
RICHARD W. KRITZER
BY

ATT'Y

Jan. 15, 1963 R. W. KRITZER 3,073,461
FIN STOCK FEEDING APPARATUS
Filed April 20, 1961 5 Sheets-Sheet 5

INVENTOR:
RICHARD W. KRITZER
BY
Norman Gerlach
ATT'Y

United States Patent Office 3,073,461
Patented Jan. 15, 1963

3,073,461
FIN STOCK FEEDING APPARATUS
Richard W. Kritzer, 1355 N. Astor St., Chicago, Ill.
Filed Apr. 20, 1961, Ser. No. 104,450
11 Claims. (Cl. 214—7)

The present invention relates to fin stock feeding apparatus and has particular reference to an apparatus for preformed strips of fin stock to the closely spaced parallel guide channels associated with a loading device by means of which the fin strips are conducted to the assembly nest of an hydraulic press wherein the nested group of fin strips have applied thereto a length of serpentine tubing to produce a composite heat exchange unit.

In my copending United States patent application Serial No. 102,430, filed on April 12, 1961, and entitled "Mechanism for Stripping and Ejecting Fin-Type Heat Exchange Units From an Assembly Press," there is disclosed a heat exchange unit of the same general type as that with which the present invention is concerned, and there is also disclosed an hydraulic press having an assembly nest which, when loaded with fin strips, maintains these strips in operative position for assembly thereof on a length of serpentine tube stock to produce the composite heat exchange unit. In another copending United States patent application Serial No. 100,076, filed by me on April 3, 1961, and entitled "Automatic Apparatus for Loading an Assembly Nest with Fin Strips in the Production of Heat Exchange Units," there is disclosed an apparatus for facilitating the loading of the assembly nest of such an hydraulic press and including a work table having associated therewith a series of closely spaced channels into which the fin strips may be manually placed by an operator to the end that they may thereafter be slid along the channels and thus guided into the assembly nest so that, when received in the latter, they will assume their proper relative positions with respect to the tubing on which they are to be installed. The present invention relates specifically to a fully automatic apparatus by means of which such strips may be withdrawn one at a time from a stack of such fin strips and deposited in the channels of the nest-loading mechanism preparatory to being slid along the channels and into the assembly nest.

In order better to understand the aims and objects of the present invention, it is pointed out that, as disclosed in my aforementioned copending patent application Serial No. 100,076 a heat exchange unit of the type to which the present invention relates consists of a length of serpentine tube stock having spaced apart reach sections and curved or arcuate end sections at the ends of the straight reach sections. A series of closely spaced, elongated, parallel strips of flat fin stock are secured to and extend transversely of the straight reach sections. In fabricating and assembling such a heat exchange unit, each strip is preformed with a series of spaced notches in one longitudinal edge thereof, the notches being in the form of major circle sectors of about 235° arcuate extent. The straight reach sections of the serpentine tubing are flattened so that they are generally oval in transverse cross section. The thus notched fin strips are placed in closely spaced side-by-side parallel relationship in a series of parallel grooves provided in the assembly nest of an hydraulic press with the notches extending in transverse rows. The serpentine tubing is aligned with the assembly nest so that the reach sections thereof register vertically with the rows of notches in the fin strips and, thereafter, the press platen is caused to descend upon the nest and force the oval reach sections into the semi-circular notches and subject them to pressure in the direction of oval elongation so as to expand them to circular cross section to the end that they will frictionally engage the edges of the notches and thus become interlocked with the fin strips to produce the finished heat exchange unit.

It has previously been stated that the present invention is concerned with the withdrawal of the fin strips, one at a time, from a stack of such strips for deposition thereof in the channels of a nest-loading mechanism. Toward this end, the invention contemplates the provision of a novel stack-forming means; a novel picker means for successively withdrawing the fin strips from the stack; a novel means for transporting the withdrawn fin strips to positions of registry with the channels of the nest-loading mechanism; a novel means for releasing the fin strips after they have been brought into such registry with the channels; and novel control means for correlating the withdrawing, transporting and releasing functions of the apparatus.

Insofar as the stack forming means is concerned, the requirements of the picker mechanism are such that the stack be mobile, i.e., capable of shifting movement bodily as a unit so that a leading fin strip will always be presented to the picker mechanism, and that the stack be loosely packed. According to the present invention, by utilizing the entrance regions of certain of the major circle sector notches of each fin strip as suspension hook means for slidably supporting the fin strip on parallel, inclined trolley rods, the fin strips applied to the trolley rods may be caused to gather at the bases of the incline in the form of a loose cluster or stack to thus fulfill the requirements of the picker mechanism by means of which the strips are withdrawn one at a time from such stack.

Insofar as the picker mechanism is concerned, there is provided a novel type of rotary picker mechanism including dual picker wheels which are caused successively to operate upon the opposite ends of the leading fin strip in the stack and pick the strip evenly from the stack and apply the same to the fin-transporting mechanism.

Insofar as the fin-transporting mechanism is concerned, the inclined trolley rods employed for establishing the mobile and loosely packed stack of fin strips are extended horizontally over the guide channels which are to be filled with fin strips and the picker mechanism serves to successively feed the strips which are withdrawn from the stack to these horizontal trolley rod extensions. The strips are impelled from the picker mechanism toward their respective positions of vertical registry with the guide channels by means of one or more elongated helical worms which are rotated in timed relation to the rate of feed of the fin strips by the picker mechanism and the forward or proximate ends of which move continuously in a circular path. The proximate ends of the worm helices reach the high points of their circular paths of movement precisely as each fin strip is released by the picker mechanism and thus the fin strip is fed forwardly past the ends of the worms and into the confines of the helix interstices where it commences its forward controlled travel along the trolley rods at a rate commensurate with the rate of rotation of the worms. The successive fin strips issuing from the picker mechanism thus align themselves within the confines of the worm helices and assume equidistant spacing therealong in accordance with the helix pitch, this pitch being equal to the spacing between adjacent guide channels associated with the loading mechanism for the assembly nest of the hydraulic press. The thus spaced fin strips move in unison forwardly along the trolley rods in procession-like fashion and transversely over the guide channels with the leading fin strips moving toward a position of vertical alignment with the last channel in the series of channels, i.e., the channel farthest removed from the picker mechanism. At each turn of the worm helices, a fin strip is added to the procession of strips at the trailing end thereof and the procession continues until such time as the leading fin strip assumes a position of vertical alignment or register with the last channel of the series as aforementioned. At this time, each fin strip in the series of fin strips which have been captured within the confines of the worm helices will overlie a respective channel and assume a position of registry therewith, preparatory to simultaneous release of the fin strips so that they may fall en masse and in unison into the channels which underlie them. Means are provided for automatically terminating rotation of the impelling worms at such time as the various fin strips assume positions of registry with their respective guide channels in the assembly nest loading mechanism.

Insofar as the releasing mechanism for the fin strips is concerned, the horizontal trolley rods, which support the fin strips during their movement over the guide channels and into alignment with the respective channels, are capable of limited rocking movement throughout an angle of 90°. The over-all thickness of these rods in one direction is greater than the width of the entrance openings of the circle sector notches in the fin strips so that when the trolley rods extend through the notches with the thick dimension of the rods extending horizontally, the rods are physically confined within the notches and the strips may hang, so to speak, in trolley-like fashion on the rods while at the same time being free to slide longitudinally therealong under the influence of the impelling worm or worms. In a direction extending at a right angle to the thick dimensions of the trolley rods, their dimension is slightly less than the width of the entrance openings of the circle sector notches in the fin strips so that when the trolley rods are turned about their longitudinal axes through an angle of 90°, the fin strips will no longer find support on the trolley rods and they will drop in unison from the rods under the influence of gravitational force and fall into the channels beneath them and with which they are in vertical registry.

Insofar as the control means for correlating the transverse movement of the fin strips across the nest of channels undergoing feeding is concerned, not only is means provided for terminating the feed of the fin strips when the procession of strips has reached its final position of fin-and-channel registry, but means also are provided for automatically initiating the release mechanism for the fin strips, after which further means are provided for restarting the machine cycle to commence picker and fin strip feed operations for the next channel loading operation.

The provision of a fin stock feeding apparatus of the character briefly outlined above being among the principal objects of the present invention, numerous other objects of an ancillary nature will become readily apparent as the following description ensues.

In the accompanying five sheets of drawings forming a part of this specification, one illustrative embodiment of the invention has been shown.

In these drawings.

*The Composite Heat Exchange Unit*

Figures 10, 11:
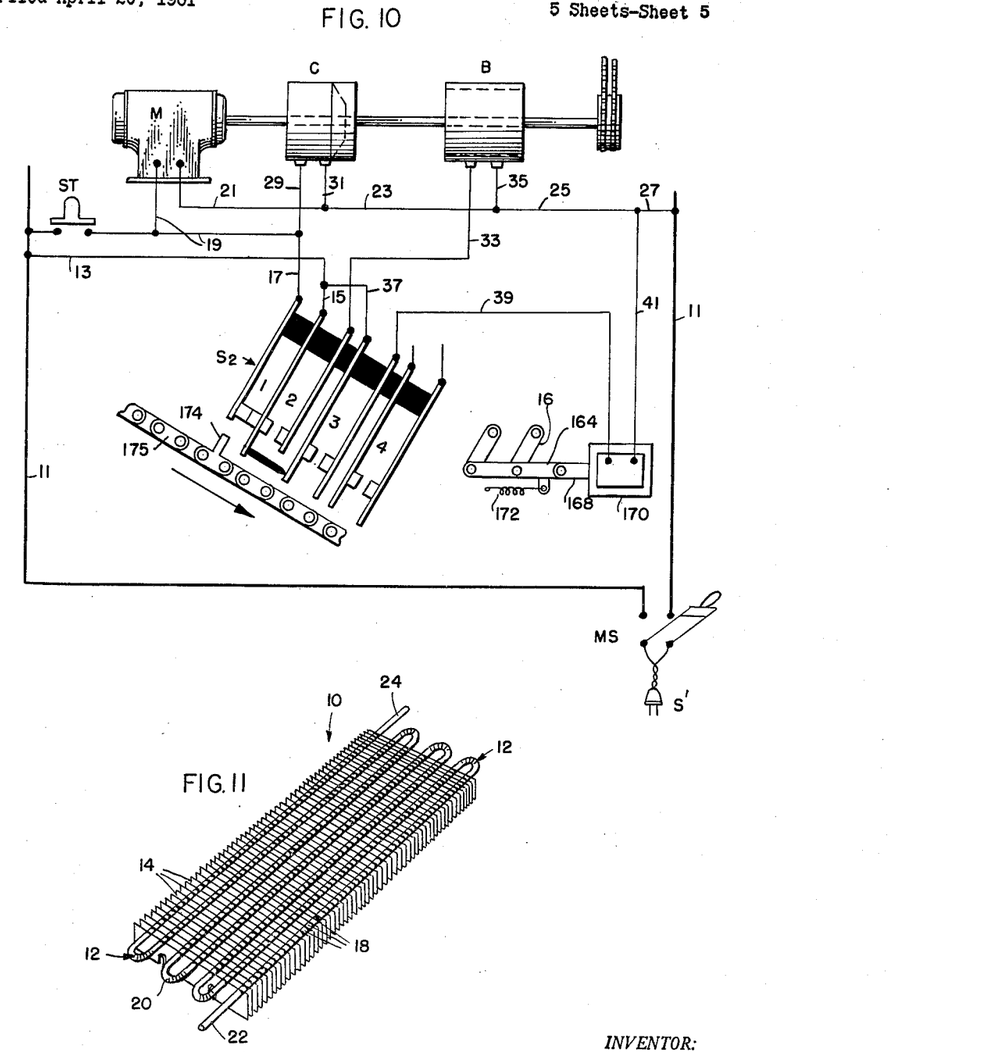
FIG. 10 is an electric circuit diagram of the apparatus.
FIG. 11 is a perspective view of a heat transfer unit of the type with which the present invention is associated.

Referring now to the drawings in detail and in particular to FIG. 11 briefly, and as disclosed in my aforementioned copending patent application Serial No. 100,076, a heat exchange unit capable of being assembled in a hydraulic or other press having an assembly nest, the loading of which may be accomplished by the present apparatus, has been designated in its entirety at 10. Briefly, the unit consists of a single length of tubing 12 which has been bent to serpentine form and to which there has been applied a series of closely spaced parallel strips 14 of preformed fin stock. Such strips establish a series of cooling fins which extend across and bridge the straight reach sections of the serpentine tube stock. The assembled tube and fin structure constitutes a basic heat exchange unit which may be operatively installed or mounted in a wide variety of installations by means of a suitable supporting framework including specially constructed mounting brackets (not shown) and other adjuncts.

The method of forming the assembling of the various fin strips 14 upon the length of serpentine tubing 12 is pertinent to the present apparatus and it is similar to the method which is shown in United States Patent No. 2,913,806, granted on November 24, 1959, and entitled "Fabrication of Heat Transfer Units," and reference may be had to this patent for a detailed description of such method. It is deemed sufficient for purposes of disclosure herein to state that each strip 14 is severed from a large sheet of metal, preferably aluminum, and that each strip is provided with one longitudinal edge which is interrupted at spaced regions therealong by arcuate notches 16 (see FIGS. 6, 7 and 8). Each notch 16 constitutes a major circle sector which is somewhat greater in extent than 180°. The length of tubing 12 includes, as hereinbefore indicated, a series of straight reach sections 18 and reverse bends 20 at the ends of the straight reach sections. The free ends 22 and 24 of the tubing 12 terminate at the opposite ends of the unit, each end being coaxial with one of the straight reach sections. As described in the aforementioned patent, prior to their association with the fin strips 14, the straight reach sections 18 are oval or elliptical in cross section and the major axes of the ellipses are slightly less than the restricted entrance openings of the notches 16. The fin strips 14 are confined in a series of closely spaced upwardly facing grooves associated with an assembly nest with the notches 16 extending in transversely extending rows. The length of serpentine tubing 12 is then positioned above the assembly nest so that the straight reach sections 18 register vertically with the transverse rows of notches 16 and thereafter the pressing platen of the hydraulic press is caused to descend upon the nest and force the straight reach section 18 into the notches of the various rows in the direction of oval elongation and against the bottoms of the notches so as to cause the tubing to expand into intimate contact with the edges of the notches 16. In this manner, the fin strips 14 are frictionally bonded to the reach sections of the tubing in intimate heat exchange relationship to produce the assembly 10 shown in FIG. 11.

As best seen in FIGS. 4, 6, 7 and 8, the lower longitudinal edge of each strip 14 is formed with a pair of relatively deep notches 26 therein and the metal of the strip along the edges of these notches is turned laterally as at 28 to provide a spacer flange by means of which, when the strips are stacked in a manner that will be described presently for cooperation with the picker mechanism of the present invention, the strips will be maintained in slightly separated positions for effective cooperation with the picker mechanism.

Figures 1, 1A:
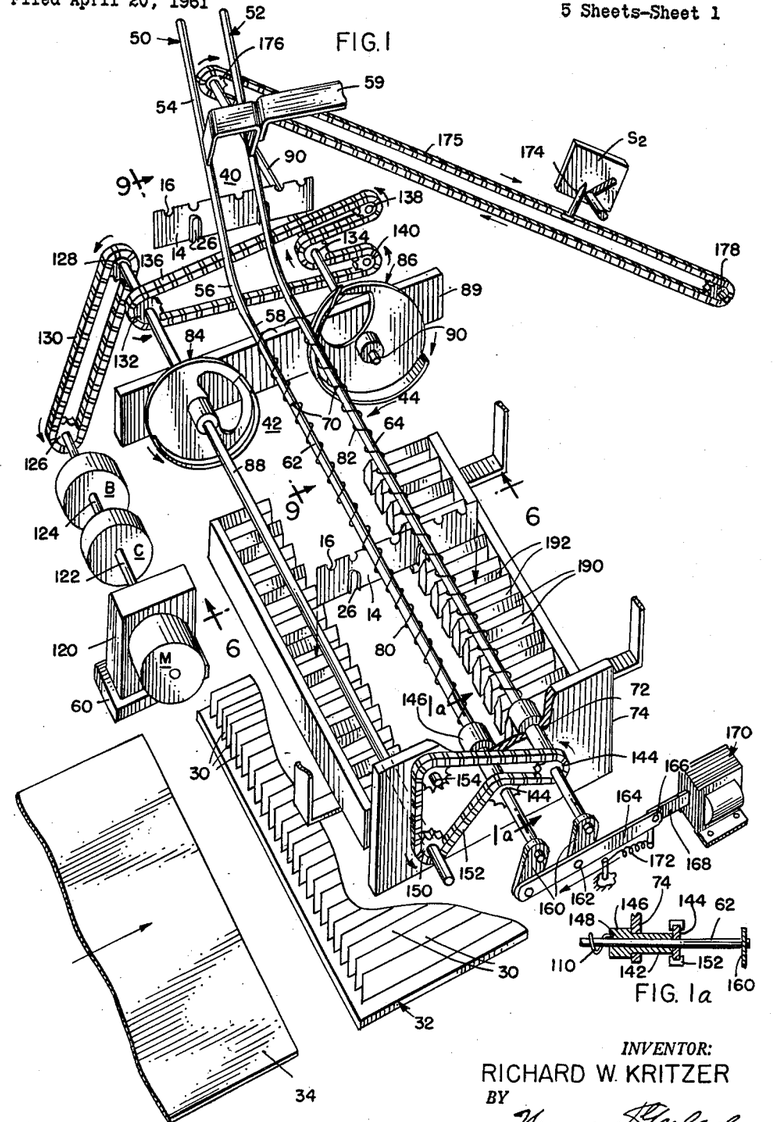
FIG. 1 is a perspective view, somewhat schematic in its representation, of a fin stock feeding apparatus constructed according to the principles of the present invention.
FIG. 1a is an enlarged sectional view taken on the line 1a—1a of FIG. 1.

Referring now to FIG. 1, the assembly nest of the hydraulic press is adapted to be fed by positioning the strips 14 on edge in a series of channels 30 which are arranged in closely spaced parallelism on the upper surface of a feed or worktable 32. These channels 30 are of elongated design and they extend from a loading station at which the mechanism of the present invention is disposed to one side of the assembly nest where they communicate with the ends of the grooves in the assembly nest. By filling the channels with respective fin strips 14 and then sliding the strips en masse along the channels, the strips may be introduced endwise into the grooves of the assembly nest. For this purpose, a suitable pusher plate 34 is reciprocable over the upper face of the table 32 above the channels 30 in a manner disclosed in my copending patent application Serial No. 100,076.

General Considerations

Still referring to FIG. 1, the fin stock feeding apparatus of the present invention involves in its general organization a stack forming assembly 40 by means of which a loosely packed mobile or group of fin strips 14 may be established, a picker mechanism 42 for withdrawing fin strips from the stack one at a time, a fin transporting and impelling mechanism 44 for conducting the fin strips which are withdrawn by the picker mechanism 42 from the stack over the upper surface of the table 32 and aligning the fin strips with respective channels 30, driving instrumentalities including a motor M, clutch C and brake B together with a suitable power train for actuating the picker mechanism 42 and impelling mechanism 44, and control instrumentalities, which have been shown in FIG. 10, for the driving mechanism.

The Stack Forming Means

Figure 6:
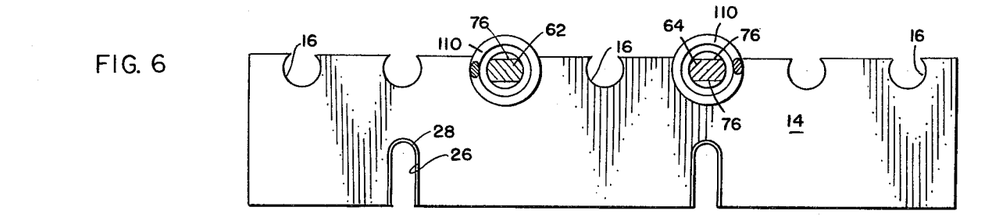
FIG. 6 is a sectional view taken substantially on the vertical plane indicated by the line 6—6 of FIG. 1 and in the direction indicated by the arrows.
Figure 9:
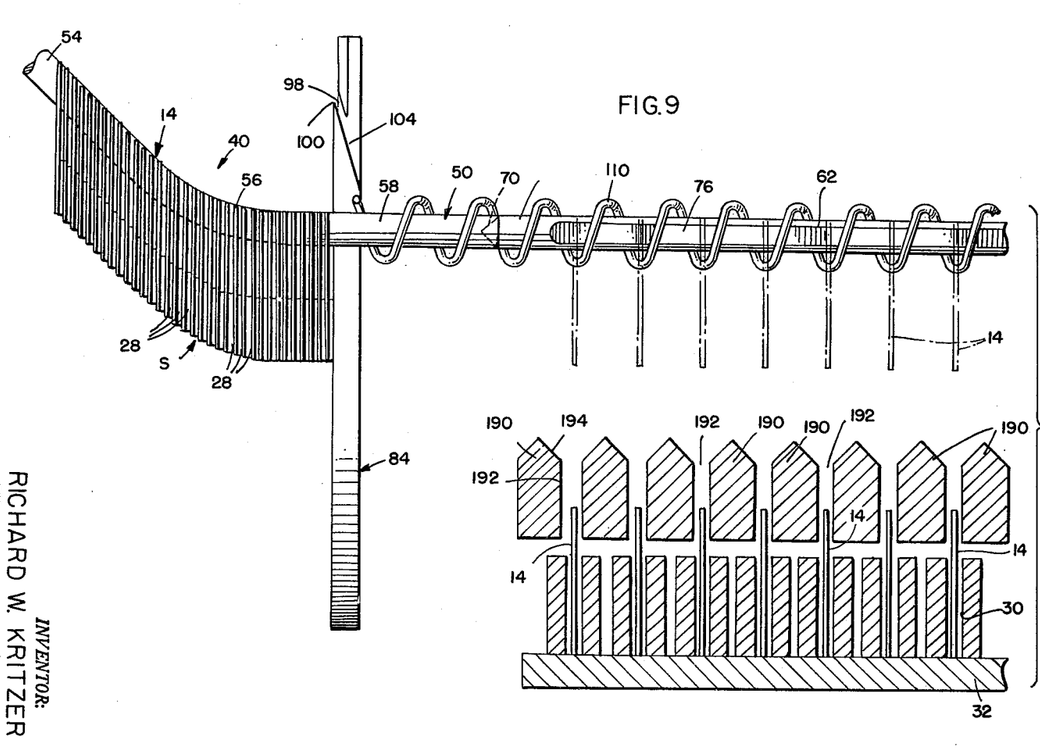
FIG. 9 is a sectional view taken substantially on the vertical plane indicated by the line 9—9 of FIG. 1 and in the direction indicated by the arrows.

Referring now to FIGS. 1 and 9, the stack forming means 40 whereby a loosely packed stack, such as the stack S of fin strips 14 may be formed comprises a pair of inclined cylindrical suspension rods 50 and 52 respectively. These rods extend in parallelism and each rod is provided with an inclined portion 54 which merges gradually on a curved bias by means of an arcuate portion 56 with a straight horizontal portion 58. The two rods 50 and 52 may be supported in fixed relationship by means of a suitable bracket assembly 59. The distance between the two parallel rods 50 and 52 is precisely equal to the center-to-center distance between adjacent notches 16 in the fin strips 14, while the diameter of each rod is slightly less than the diameter of the major circle sectors of the various notches yet appreciably greater than the width of the entrance openings leading to these notches. The fin strips 14 may therefore be suspended from the two rods 50 and 52 in trolley-like fashion by threading a pair of the notches 16 over the upper ends of the rods, and thereafter releasing the strips so that they will slide down the inclined portions 54 of the rods and onto the curved portions 56 thereof. Due to the fact that the diameter of the rods is greater than the entrance opening leading to the notches 14, the strips, after they have been inserted on the rods in the manner previously described, will be captured by the rods so that they may not be removed edgewise therefrom. As shown in FIG. 6, the upper regions of the notches 16 will rest upon the rods and, functioning in the manner of a pair of overhanging hooks, they will serve to suspend the fin strip from the rod while at the same time allowing sliding movement of the fin strips along the rods. The angle of inclination of the portions 54 of the two rods is, of course, in excess of that required to overcome the coefficient of sliding friction, so that the strips, when threaded upon the rods in the manner set forth above, will move rapidly down the incline under the influence of gravitational force.

The Fin Transporting and Impelling Mechanism

The forward ends of the horizontal portions 58 of the rods 50 and 52 are provided with horizontal rod extensions 62 and 64, respectively, these extensions being connected to their respective rods by swivel connections 70 (see FIG. 3) in the form of mating frusto-conical end surfaces. The forward ends of the rod extensions 62 are rotatably journaled as at 72 in a plate 74 which constitutes a part of the fixed framework of the apparatus. The rods 62 and 64 are each provided with oppositely facing flat side faces 76, these flat faces extending along the rod for a major portion of its length. The two oppositely disposed faces 76 lie in parallel planes, the distance between which is less than the width of the entrance openings of the various notches 16. Since the rods 62 and 64 constitute extensions of the rods 50 and 52, the fin strips 14 leaving the stack S and moving forwardly away from the picker mechanism 40 will slide onto the rods 62 and 64 and be impelled longitudinally therealong to their respective positions of registry with the underlying channels 30 on the table 32. After the various fin strips 14 have moved into register with the channels which they overlie, the rods 62 and 64, whose flat side surfaces 76 normally lie in respective horizontal planes as shown in FIG. 6, are adapted to be turned throughout an angle of 90° to cause the flat side surfaces 76 to assume vertical positions, at which time such fin strips as may be suspended on these rods will be released so that they may fall by gravity toward their respective guide channels 30 in a manner that will be described in greater detail presently.

The impelling means for moving the strips longitudinally along the rod extensions 62 and 64 comprises a pair of elongated worms 80 and 82 of relatively long pitch. These worms are in the form of wire coil springs which surround the rods 62 and 64 and are adapted to be rotated continuously for fin-impelling purposes. Accordingly, they operate in a manner of screw conveyors to slide the fin strips 14 forwardly along the rod extensions 62 and 64. The rear ends of the fin-impelling worms co-operate with the picker mechanism 42 to receive the fin strips discharged by the picker mechanism and conduct the same forwardly away from the picker mechanism and transversely over the table 32. Means are provided for rotating the two helical worms in unison and means are also provided for causing limited turning movement of the rod extensions 62 and 64 throughout an angle of 90°, all in a manner that will be made clear presently.

Figure 5:
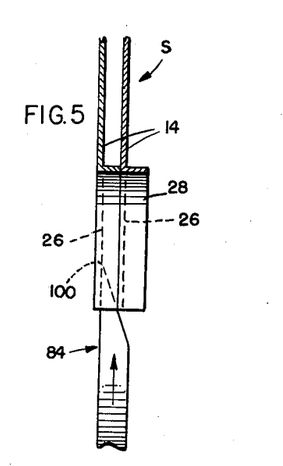
FIG. 5 is a fragmentary sectional view taken vertically through the two leading or foremost strips of fin stock in the feed stack and illustrating the manner in which the picker mechanism cooperates therewith.

Referring now to FIG. 5, it will be seen that the stack S, which is formed adjacent the lower ends of the rods 50 and 52, is comprised of fin strips 14, the body portions of which remain slightly spaced from one another by virtue of the spacing effect afforded by the flanges 28 which are provided along the edge regions of the notches 26. The fin strips 14 existing in the stack S are loosely packed by virtue of the fact that these strips are made of a light metal, such as aluminum, and also by virtue of the fact that the full gravitational force of one strip against its adjacent strip is not applied due to the inclination of the rods 50 and 52. The strips, therefore, rest lightly against one another and they are maintained spaced apart a sufficient distance that the picker element proper associated with the picker mechanism 42 will have no difficulty in selectively entering between the leading fin strip 14 in the stack and the next adjacent fin strip.

The Picker Mechanism

Figures 2, 3:
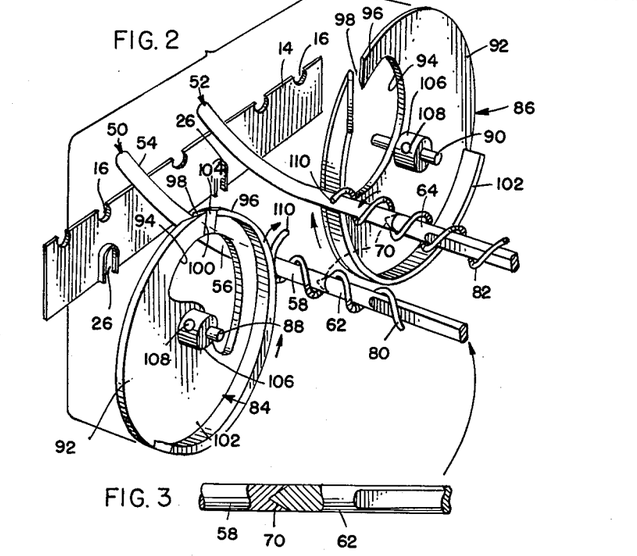
FIG. 2 is an enlarged fragmentary perspective view of a picker mechanism employed in connection with the invention.
FIG. 3 is an enlarged detail side elevational view, partly in section, of a swivel joint employed in connection with one of the trolley rods of the present apparatus.
Figure 4:
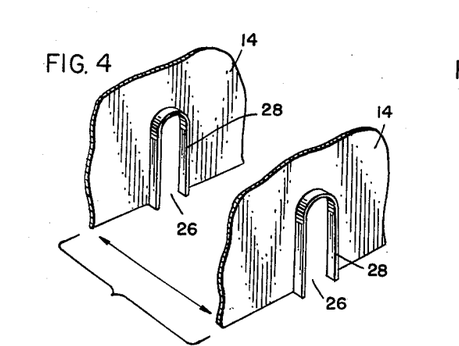
FIG. 4 is a fragmentary exploded perspective view portion of adjacent strips of fin stock in the fin stock feed stack.

Referring now to FIGS. 1, 2 and 9, the picker mechanism 42 is comprised of two complementary picker wheels 84 and 86. The wheel 84 is fixedly mounted on an elongated rotatable shaft 88 which is rotatably journalled adjacent its opposite ends in the framework plate 74 and in a transverse frame bar 89. The shaft 88 overlies and extends across the upper face of the table 32 transversely thereof. The picker wheel 86 is fixedly mounted on a short shaft 90, likewise journaled in the machine framework. The two shafts 88 and 90 are parallel and the two picker wheels 84 and 86 assume positions on their respective shafts which are coplanar.

As best seen in FIG. 2, the picker wheel 84 includes a flat substantially circular disk-like body portion 92 which has a generally kidney-shaped relief void 94 extending axially therethrough on one side of the wheel axis, thus defining an arcuate rim region 96. The medial portion of the rim region 96 is provided with a narrow transverse slot 98 therethrough (see FIG. 9) which physically separates the two adjacent ends of the arcuate rim region so that the relief void 94 constitutes, in effect, an undercut part of the slot. The slot 98 extends at a small acute angle with respect to the general plane of the wheel thus defining a relatively sharp picker edge 100 which, when the picker wheel is rotated in the direction indicated by the adjacent arrow in FIG. 2 is adapted to enter between the leading fin strip 14 in the stack and the next adjacent fin strip to select the leading fin strip for forward impelling away from the stack. To accomplish this, the body portion 92 of the picker wheel 84 is deformed to a slight extent so that the picker edge 100 is slightly offset rearwardly from the general plane of the picker body 92. A narrow peripheral region of the picker wheel body 92 is thickened as at 102 and this thickened portion extends around the periphery of the wheel body 92 from the slot 98 throughout an arcuate extent of slightly more than 180°. The end of the thickened portion 102 in the immediate vicinity of the slot 98 presents an elongated inclined edge 104 which constitutes the cam surface designed for camming engagement with the lower edge of the leading fin strip 14 in the stack S for impelling the fin strip forwardly along the horizontal portions of the rods 50 and 52. Each picker wheel is provided with a central hub 106 through which there extends a set screw 108 by means of which the wheel is fixedly secured on its respective shaft and also by means of which it may be adjusted on the shaft for proper co-operation with the fin strips 14 in the stack S as well as with the other picker wheel.

The picker wheel 86 is similar to the picker wheel 84 except for the fact that it is complementary in design. To avoid needless repetition of description identical reference numerals have been applied to the corresponding parts of the two wheels. The two shafts 88 and 90 are adapted to be rotated in opposite directions so that the picker wheels 84 and 86 will similarly rotate in opposite directions as indicated by the arrows in FIGS. 1 and 8. The two wheels are initially adjusted on their respective shafts 88 and 90 in such a manner that the picker edges 100 associated therewith will enter between adjacent fin strips 14 at precisely the same moment during each revolution of the two picker wheels. The two picker edges 100 move upwardly in an arcuate path from beneath the stack and engage the leading fin strip 14 in the stack at widely spaced regions along the lower edges of the strip so that this lower edge region of the strip is swung outwardly away from the stack and thereafter the picker edges 100 pass upwardly between the leading fin strip and the next adjacent fin strip so that the fin strip as a whole passes through both slots 98 with the ends of the strip moving forwardly through the kidney-shaped voids 94.

Fin Strip Transfer Operations

The two worms 80 and 82 are adapted to be rotated in opposite directions as indicated by the adjacent arrows in FIG. 2 in timed relation to the rotation of the two picker wheels 84 and 86. The extreme forward ends 110 of these worms constitute, in effect, small picker elements which move behind each fin strip 14 as it is released from the adjacent picker wheel and causes the upper edge of the fin strip to be moved within the confines of the helical worm so that as the worm continues to rotate the body of the worm will exert a continuous camming action on the strip and impel it forwardly at a constant rate of speed, thus transferring the fin strip from the picker mechanism 42 to the impeller mechanism 44. The pitch length, i.e., the distance between adjacent convolutions of the worm, is precisely equal to the center-to-center distance between adjacent channels 30 on the upper face of the table 32. Each worm 80 and 82 makes one revolution and the rear ends of the worms are so adjusted that as soon as a leading fin strip 14 is released from the stack S the end 100 of the worm passes over the upper edge of the fin strip to capture the fin strip within the confines of the helical worm.

From the above description it will be seen that upon continued rotation of the two worms, a procession of fin strips will travel along the horizontal portions 58 of the rods 50 and 52 and along the rod extensions 62 and 64, the fin strips in the procession being slidably suspended from the rods and rod extensions, being equally spaced and lying in respective vertical planes. At such time as the foremost fin strip 14 in the procession becomes vertically aligned with the most remote channel 30 of the table 32, means are provided for terminating the movements of the worms and picker wheels and for thereafter rotating the rod extensions 62 and 64 throughout an angle of 90° to release all of the fin strips suspended therefrom simultaneously and allow them to drop into the aligned channels therebeneath.

The Driving Mechanism

The means for rotating the two picker wheels 84 and 86 and the two worms 80 and 82 have been illustrated in FIG. 1. The motor M, clutch C and brake B are schematically shown in this view. The motor M operates through a gear reduction device 120 to impart rotation to the driving shaft 122 of the clutch C. The driven shaft 124 of the clutch is operatively associated with the brake B and it carries a small driving sprocket 126 which is connected to a driven sprocket 128 on the shaft 88 by means of a chain 130. An additional sprocket 132 on the shaft 88 is connected to a sprocket 134 on the shaft 90 by means of a chain 136 which passes over a pair of idler sprockets 138 and 140. The sprocket 134 is offset from the center line of the two sprockets 94 and 96 in such a manner that the chain 92 has a reentrant portion which causes the sprocket 134 to rotate in a direction opposite to the direction of rotation of the sprocket 132. The two shafts 88 and 90 are thus caused to rotate in opposite directions. Since the diameters of the sprockets 132 and 134 are equal, the rate of rotation of the two shafts 88 and 90 is the same. The end region of each rod extension 62 and 64 remote from the picker mechanism 42 carries a spool-shaped sleeve 142 (FIG. 1a) having a sprocket 144 formed on one end thereof and an enlarged cylindrical head 146 on the other end. The sleeve is rotatable on the rod and one end of the worm 80 or 82, as the case may be, has its end turned laterally as at 148 and anchored in the head 146 so that upon rotation of the spool 142 the worm associated therewith will also be rotated. The end of the shaft 88 remote from the picker mechanism 42 carries a sprocket 150, and a chain 152 passes over one of the sprockets 144, beneath the other sprocket 144, over an idler sprocket 154 and around the sprocket 150. In this manner, the two sleeves 142 are driven in opposite directions upon rotation of the shaft 88. The number of teeth on the sprockets 150 and 144 is the same as the number of teeth on the sprockets 132 and 134 so that the rate of rotation of the two worms 80 and 82 is the same as that of the two picker wheels 84 and 86.

*The Fin Strip Release Mechanism*

In order to rock the two fin-supporting shaft extensions 62 and 64 in unison throughout an angle of 90° for fin-releasing purposes as previously described, the remote ends of the rod extensions carry crank arms 160 which are pivoted as at 162 to an actuating arm 164 which in turn is pivoted as at 166 to the movable core 168 of the solenoid 170. A spring 172 (see FIG. 10) maintains the movable core 168 in a normally extended position and, upon energization of the solenoid 170, the core is adapted to be retracted to shift the actuating arm 164 to the right as viewed in FIG. 1 and thus swing the two crank arms 160 throughout an angle of 90° to rotate the rod extensions 62 and 64 from their fin-supporting positions to their positions of fin release. Upon the energization of the soleiod 170, the spring 172 restores the core 168 to its extended position and consequently restores the two rod extensions 62 and 64 to their fin-supporting positions.

*Operation and Electrical Control Devices*

In the operation of the apparatus, an operator will apply a fin strip to the upper ends of the inclined portions 54 of the rods 50 and 52 in the manner previously described by threading two of the notches 16 provided in the upper edges of the fin strips over the ends of the rods and then releasing the fin strips. For proper balance of the fin strips 14, the strips should be centered on the rods 50 and 52 so that the extent of overhang at the outer sides of the rods will be approximately equal. In FIGS. 1 and 6 the strips are shown as being suspended on the rods by means of notches 16 which are once removed from each other and with the transverse center line of each strip being disposed midway between the two rods. This is possible in many instances but, where the notches 16 are so disposed that centering of the strips on the rods 50 and 52 is not possible, a slight excess of overhang of the strips on one side of the suspension means may be tolerated, particularly since the strips are formed of light weight metal so that the unbalance will be small. The effect of any such unbalance may be minimized by causing the rods 50 and 52 to be more widely spaced. Application of a large number of the fin strips to the rods 50 and 52 at one time is facilitated by sliding previously stacked groups containing a large number of fin strips onto the rods.

Upon release of the fin strips 14, they will slide by gravity downwardly along the incline portions 54 of the rods 50 and 52 and the foremost fin strip will come to rest with its end regions flat against the rear sides of the body portions 92 of the two picker wheels 84 and 86 so that the stack S of fin strips will build up at the rear of the picker wheels as shown in FIG. 9, the stack being loosely packed due to the lightness of the fin strip material and due to the spacing afforded by the flanges 28 as herebefore set forth. Upon closure of the master switch MS (FIG. 10), electrical current will be made available from a source S1 which may be a conventional 110 or 220 volt power line for operation of the machine. Upon such closure of the master switch, an electrical circuit will exist from one side of the line 11 through leads 13, 15, #1 contacts of the switch S2, leads 17, 19, motor M and leads 21, 23, 25, 27, back to the line 11. At the same time a parallel circuit will exist through the electromagnetic clutch C, this circuit also extending through the #1 contacts of the switch S2 and proceeding from the leads 17 through leads 29, clutch C, and leads 31, 23, 25, 27, back to the line. Such energization of the motor M and clutch C will effect operation of the power train including the various chain and sprocket devices previously described so that the two picker wheels 84 and 86 will be set into motion and rotated in opposite directions as indicated by the arrows in FIGS. 1 and 2, while also the sleeve members 142 (see FIGS. 1 and 1a) will be rotated in opposite directions thus to cause the worms 80 and 82 similarly to be rotated.

Rotation of the picker wheels 84 and 86 will, as previously described, effect repeated selection of the foremost or leading fin strip 14 in the stack S, withdrawal of such fin strip from the stack, passage of the fin strip through the inclined slits 102 and kidney-shaped voids 94 of the wheels, transfer of the strip, and movement of the strip forwardly along the horizontal portion 58 of the rods 50 and 52 to a region wherein it is engaged by the two worms 80 and 82. Due to the correlation of movements between the worms and the picker wheels, the free ends 110 of the worms will pass over the upper edges of the leading fin strip and thus start this fin strip on its way forwardly along the rod extensions 62 and 64 which, at such time are disposed so that their flat sides 76 lie in horizontal planes as shown in FIG. 6. Under the impelling influence of the two worms, the leading fin strip 14, while being maintained in suspended relationship from the rod extensions 62 and 64, will be caused to slide forwardly on these rods, followed by successive fin strips as they issue from the stack under the influence of the picker mechanism 42.

At such time as the leading fin strip 14 in the procession of fin strips traveling along the rod extensions 62 and 64 substantially completely traverses the table 32 and overlies the most remote channel 30, a finger 174 (see FIGS. 1 and 10) which is provided on a timing chain 175 extending between a sprocket 176 on the shaft 90 and idler sprocket 178, engages the microswitch S2 and reverses all of the contacts thereof, thus opening the #1 contacts, and consequently opening the circuits for both the motor M and clutch C. At the same time that the #1 contacts become open, the #2 and #3 contacts of the microswitch S2 become closed. Closure of the #2 contacts will establish an electrical circuit extending from the line 11, through leads 13, 15, #2 contacts of the microswitch S2 now closed, lead 33, electromagnetic brake B and leads 35, 25, 27 back to the line. The energization of the brake in this manner, accompanied by deenergization of the clutch C and stopping of the motor M will discontinue operation of both the picker mechanism 42 and the impelling mechanism 44 so that the various fin strips 14, which are now suspended above the table, each in alignment with one of the channels 30, will remain poised momentarily in this position preparatory to their release from the rod extensions 62 and 64.

Figure 7:
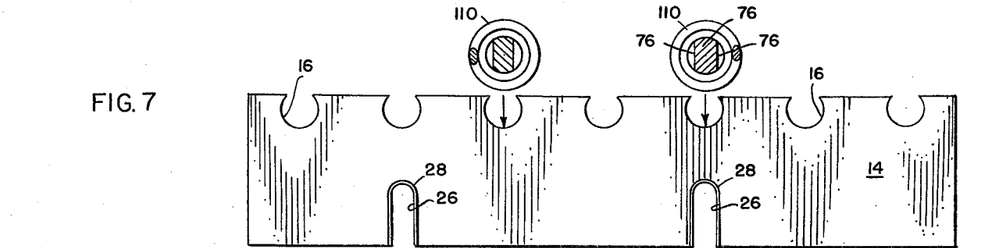
FIG. 7 is a sectional view similar to FIG. 6 but showing the fin strip immediately after it has been released from the trolley rods.
Figure 8:
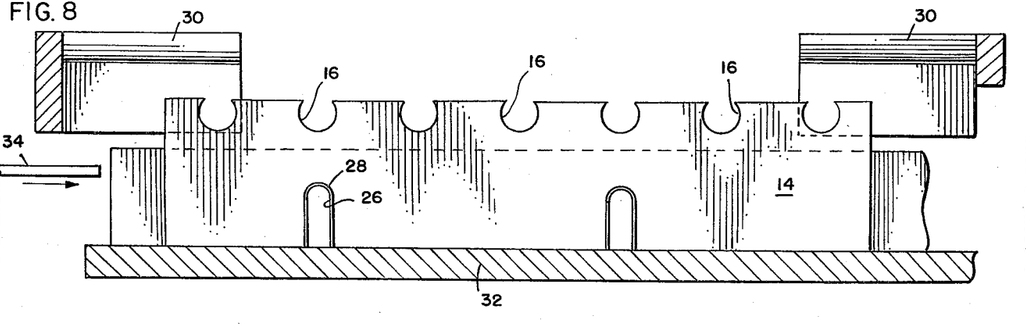
FIG. 8 is a sectional view similar to FIGS. 6 and 7 but showing the fin strip after it has been deposited in its respective guide channel and illustrating the means whereby the strip is guided in its vertical descent into the channel.

Release of the fin strips 14 from the rod extensions 62 and 64 will take place upon closure of the #3 contacts of the microswitch S2. Upon such closure of the #3 contacts, an electrical circuit will exist from the line 11 through leads 13, 37, #3 contacts of the microswitch S2, lead 39, solenoid 170 and leads 41, 27 back to the line. Energization of the solenoid 170 will cause the core 168 thereof to be retracted against the action of the spring 172 so as to move the actuating rod 164 to the right as viewed in FIGS. 1 and 10 and swing the crank arms 160 in a counterclockwise direction to thus rotate the rod extensions 62 and 64 throughout an angle of 90°. Such rotation of the rods 62 and 64 will cause them to assume positions wherein the flat sides 76 thereof extend vertically as shown in FIG. 7. This results in a reduction in the existing horizontal thickness of the rod to such an extent that it is less than the extent of the entrance openings of the slots 16 so that the strips 14 will no longer find support on the rods 62 and 64 and will fall by gravity downwardly therefrom simultaneously and enter the various channels 30 in the table 32 with which these fin strips are aligned.

As shown in FIG. 9, in order to guide the fin strips 14 edgewise and downwardly into the channels 30 and preclude misalignment of the strips with the channels during their downward fall, as for example, under the deflecting influence of air resistance or other factors, a plurality of guide blocks 190 are fixedly positioned immediately above the channels in spaced relationship with respect to one another and these guide blocks 190 define therebetween a series a guide passages 192 which are aligned with the fin strips thereabove and with the channels therebeneath. The upper regions of the blocks 190 are tapered as at 194 to facilitate entry of the lower edges of the strips 14 into the guide passages 192. In this connection it is to be noted that certain of the channels 30 are in vertical register with the guide passages 192 while others of the channels are not so aligned but instead have their entrance openings blocked by the presence of the guide blocks 190 immediately thereabove. Such an arrangement may be resorted to in accordance with the principles set forth in my hereinbefore mentioned copending patent application Serial No. 100,076 wherein a plurality of loading stations are provided along the worktable 32. The channels which are blocked at the particular loading station illustrated in FIG. 1, are available for loading by a second loading apparatus identical with the one illustrated herein at a different loading station and the channels which are available at the loading station of FIG. 1 will be similarly blocked at such second loading station. An arrangement of this character is resorted to when groups of fin strips of different lengths are being fed to the assembly nest of the hydraulic press.

The normally open #4 contacts of the microswitch S2 may be employed for initiating movement of the pusher plate 34 along the table 32 to sweep the fin strips 14 which have been deposited in the channels 30 from the loading station and along the channels toward the assembly nest of the hydraulic press. The circuit for these #4 contacts has not been illustrated herein but when these contacts are used, the apparatus becomes a fully automatic one. A start button ST is provided for the purpose of restarting the motor after the motor circuit has been opened by opening of the #1 contacts of the microswitch S2. Upon depression of the start button a circuit will extend from the line 11 through the start button directly to the motor and from thence through leads 21, 23, 25 and 27 back to the line.

The invention is not to be limited to the exact arrangement of parts shown in the accompanying drawings or described in the specification as various changes in the details of construction may be resorted to without departing from the spirit of the invention. Therefore, only insofar as the invention has been particularly pointed out in the accompanying claims is the same to be limited.

Having thus described the invention what I claim as new and desire to secure by Letters Patent is:

1. Apparatus for feeding elongated metal fin strips to the assembly nest of an hydraulic press, each fin strip being provided with a pair of spaced notches having restricted entrance openings in one longitudinal edge thereof, said apparatus comprising, in combination, a feed table presenting a series of closely spaced narrow upwardly facing parallel elongated guide channels leading to the assembly nest, a pair of parallel horizontally disposed suspension rods overlying said table and extending transversely of the channels, said suspension rods being adapted to receive slidably thereon the fin strips with the rods extending loosely through the notches in the latter, each of said suspension rods having a long transverse dimension in one direction greater than the width of the entrance openings of the notches in the fin strips and a short transverse dimension in another direction less than the width of said entrance openings, said suspension rods being capable of limited angular rocking movement about their respective axes between operative strip-supporting positions wherein the long dimensions thereof extend horizontally and inoperative positions of release wherein the short dimensions thereof extend horizontally, and means for simultaneously shifting said suspension rods between their operative and inoperative positions.

2. Apparatus for feeding elongated metal fin strips to the assembly nest of an hydraulic press as set forth in claim 1 and wherein said means for shifting the suspension rods comprises a crank arm having its proximate end secured to each suspension rod, an actuating arm common to said crank arms and pivoted to the distal ends thereof, a motor having an extensible and retractible plunger, and a pivotal connection between said plunger and the actuating arm.

3. Apparatus for feeding elongated metal fin strips to the assembly nest of an hydraulic press, each fin strip being provided with a pair of spaced notches having restricted entrance openings in one longitudinal edge thereof, said apparatus comprising, in combination, a feed table presenting a series of closely spaced narrow upwardly facing parallel elongated guide channels leading to the assembly nest, a pair of parallel, horizontally disposed suspension rods overlying said table and extending transversely of the channels, said suspension rods being adapted to receive slidably thereon the fin strips with the rods extending loosely through the notches in the latter, each of said suspension rods having a long transverse dimension in one direction greater than the width of the entrance openings of the notches in the fin strips and a short transverse dimension in another direction less than the width of said entrance openings, means for impelling fin strips received on said rods adjacent one side of the table along the rods while maintaining adjacent strips spaced from each other a distance commensurate with the spacing of said guide channels, said suspension rods being capable of limited angular rocking movement about their respective axes between operative strip-supporting positions wherein the long dimensions thereof extend horizontally and inoperative positions of release wherein the short dimensions thereof extend horizontally, and means for simultaneously shifting said suspension rods between their operative and inoperative positions.

4. Apparatus for feeding elongated metal fin strips to the assembly nest of an hydraulic press as set forth in claim 3 and wherein the strip-impelling means comprises a worm mounted for rotation about an axis parallel to the axes of said suspension rods and operable upon rotation thereof in one direction to confine the edges of the fin strips between adjacent turns of the worm helix.

5. Apparatus for feeding elongated metal fin strips to the assembly nest of an hydraulic press as set forth in claim 3 and wherein the strip-impelling means comprises an elongated worm in the form of a helically wound wire surrounding each suspension rod and rotatable thereon, said worms being operable upon rotation thereof to confine the edges of the fin strips between adjacent turns of the worm helices, and means for rotating said worms in unison.

6. Apparatus for feeding elongated metal fin strips to the assembly nest of an hydraulic press as set forth in claim 5 and wherein said worms have opposite thread directions and wherein said means for rotating the worms is effective to rotate them in opposite directions.

7. Apparatus for feeding elongated metal fin strips to the assembly nest of an hydraulic press, each fin strip being provided with a pair of spaced notches having restricted entrance openings in one longitudinal edge thereof, said apparatus comprising, in combination, a feed table presenting a series of closely spaced narrow upwardly facing parallel elongated guide channels leading to the assembly nest, a pair of parallel, horizontally disposed suspension rods overlying said table and extending transversely of the channels, said suspension rods being adapted to receive threaded and slidably thereon the fin strips with the rods extending loosely through the notches in the latter, each of said suspension rods having a long transverse dimension in one direction greater than the width of the entrance openings of the notches in the fin strips and a short transverse dimension in another direction less than the width of said entrance openings, said suspension rods being capable of limited rocking movement about their respective axes between strip-supporting positions wherein the long dimensions thereof extend horizontally and inoperative positions of release wherein the short dimensions thereof extend horizontally, means adjacent one side of said feed table for supporting a stack of fin strips with the leading strip in the stack disposed in a vertical plane and with the notches therein in registry with the adjacent ends of the suspension rods, picker mechanism for successively withdrawing the leading strip in said stack and threading the same onto the suspension rods, means for impelling the withdrawn fin strips along the suspension rods while maintaining adjacent strips spaced from each other a distance commensurate with the spacing of said guide channels, and means for simultaneously shifting said suspension rods between their operative and inoperative positions.

8. Apparatus for feeding elongated metal fin strips to the assembly nest of an hydraulic press as set forth in claim 7 and wherein said stack-supporting means comprises a second pair of parallel suspension rods disposed at one side of the feed table, having a transverse horizontal dimension greater than the width of the entrance openings of the notches in the fin strips, having inclined portions which are sufficiently steep as to overcome the coefficient of sliding friction between the edges of the notches and the portions of the rods engaged thereby, and having forward regions which extend horizontally and register with the rear ends of the first mentioned suspension rods.

9. Apparatus for feeding elongated metal fin strips to the assembly nest of an hydraulic press as set forth in claim 8 and wherein said forward end regions of the second mentioned suspension rods merge gradually with the inclined portions of such rods on a curved bias.

10. Apparatus for feeding elongated metal fin strips to the assembly nest of an hydraulic press as set forth in claim 8 and wherein the rear ends of the first mentioned suspension rods are piloted for turning movement in the forward ends of the second pair of suspension rods.

11. Apparatus for feeding elongated metal fin strips to the assembly nest of an hydraulic press, each fin strip being provided with a pair of spaced notches having restricted entrance openings in one longitudinal edge thereof, said apparatus comprising, in combination, a feed table presenting a series of closely spaced narrow upwardly facing parallel elongated guide channels leading to the assembly nest, a pair of parallel, horizontally disposed suspension rods overlying said table and extending transversely of the channels, said suspension rods being adapted to receive slidably thereon the fin strips with the rods extending loosely through the notches in the latter, each of said suspension rods having a long transverse dimension in one direction greater than the width of the entrance openings of the notches in the fin strips and a short transverse dimension in another direction less than the width of said entrance openings, said suspension rods being capable of limited rocking movement about their respective axes between strip-supporting positions wherein the long dimensions thereof extend horizontally and inoperative positions of release wherein the short dimensions thereof extend horizontally, means adjacent one side of said feed table for supporting a stack of fin strips with the leading strip in the stack disposed in a vertical plane and with the notches therein in registry with the adjacent ends of the suspension rods, picker means for successively withdrawing the leading strip in said stack and threading the same onto the suspension rods, means for impelling the withdrawn fin strips forwardly along the suspension rods while maintaining adjacent strips spaced from each other a distance commensurate with the spacing of said guide channels, means normally maintaining said suspension rods in their operative strip-supporting positions, means for simultaneously shifting said suspension rods from their operative to their inoperative positions, and means operable upon movement of a fin strip forwardly along the suspension rods to a position wherein it is in vertical registry with the channel which is most remote from the stack supporting means for disabling the picker means and the strip-impelling means and for actuating the rod-shifting means.

References Cited in the file of this patent

UNITED STATES PATENTS 2,969,868   Krellen ________________ Jan. 31, 1961

FOREIGN PATENTS 768,504   Great Britain ___________ Feb. 20, 1957